United States Patent
Kaji et al.

(10) Patent No.: US 7,392,380 B2
(45) Date of Patent: Jun. 24, 2008

(54) AUTHENTICATION AND AUTHORIZATION INFRASTRUCTURE SYSTEM WITH CRL ISSUANCE NOTIFICATION FUNCTION

(75) Inventors: Tadashi Kaji, Fujisawa (JP); Takahiro Fujishiro, Yokohama (JP); Yoko Kumagai, Tokyo (JP); Shingo Hane, Yokohama (JP); Hiromi Nagano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 797 days.

(21) Appl. No.: 10/456,549

(22) Filed: Jun. 9, 2003

(65) Prior Publication Data

US 2004/0111609 A1 Jun. 10, 2004

(30) Foreign Application Priority Data

Jun. 12, 2002 (JP) ............................. 2002-170798
May 7, 2003 (JP) ............................. 2003-128549

(51) Int. Cl.
*H04L 9/00* (2006.01)
(52) U.S. Cl. ........................................ 713/158; 713/156
(58) Field of Classification Search ................ 713/156, 713/158
See application file for complete search history.

(56) References Cited

U.S. PATENT DOCUMENTS

| 5,699,431 A | 12/1997 | Van Oorschot et al. |
| 6,301,658 B1* | 10/2001 | Koehler ...................... 713/155 |
| 7,225,164 B1* | 5/2007 | Candelore et al. ............. 705/57 |
| 2002/0046340 A1 | 4/2002 | Fujishiro et al. |

OTHER PUBLICATIONS

ITU-T 'X.509', Public Key Infrastructure.

* cited by examiner

*Primary Examiner*—Jacob Lipman
(74) *Attorney, Agent, or Firm*—Mattingly, Stanger, Malur & Brundidge, PC

(57) ABSTRACT

If a CRL is cached for an increased speed of a certificate validation process, when a certification authority issues a CRL in an urgent situation, the accuracy of the certificate validation result cannot be secured because the cached CRL is not the latest one. This problem is solved as follows. When it issues a CRL, the certification authority sends a CRL issuance notification to certificate validation servers. The certificate validation servers that received the CRL issuance notification cache the latest CRL. Thus, the accuracy of the certificate validation result can be secured.

7 Claims, 7 Drawing Sheets

FIG.8A

CRL ISSUANCE NOTIFICATION REQUEST MESSAGE 10 THAT REQUESTS TRANSMISSION OF CRL ISSUANCE NOTIFICATION

MESSAGE REQUESTING TRANSMISSION — SUBSCRIBE
HOSTNAME OF DESTINATION — cvs1.certvalidation.com

FIG.8B

CRL ISSUANCE NOTIFICATION REQUEST MESSAGE 10 THAT REQUESTS STOPPING OF TRANSMISSION OF CRL ISSUANCE NOTIFICATION

MESSAGE REQUESTING STOPPING OF TRANSMISSION — UNSUBSCRIBE
HOSTNAME OF DESTINATION — cvs1.certvalidation.com

FIG.9

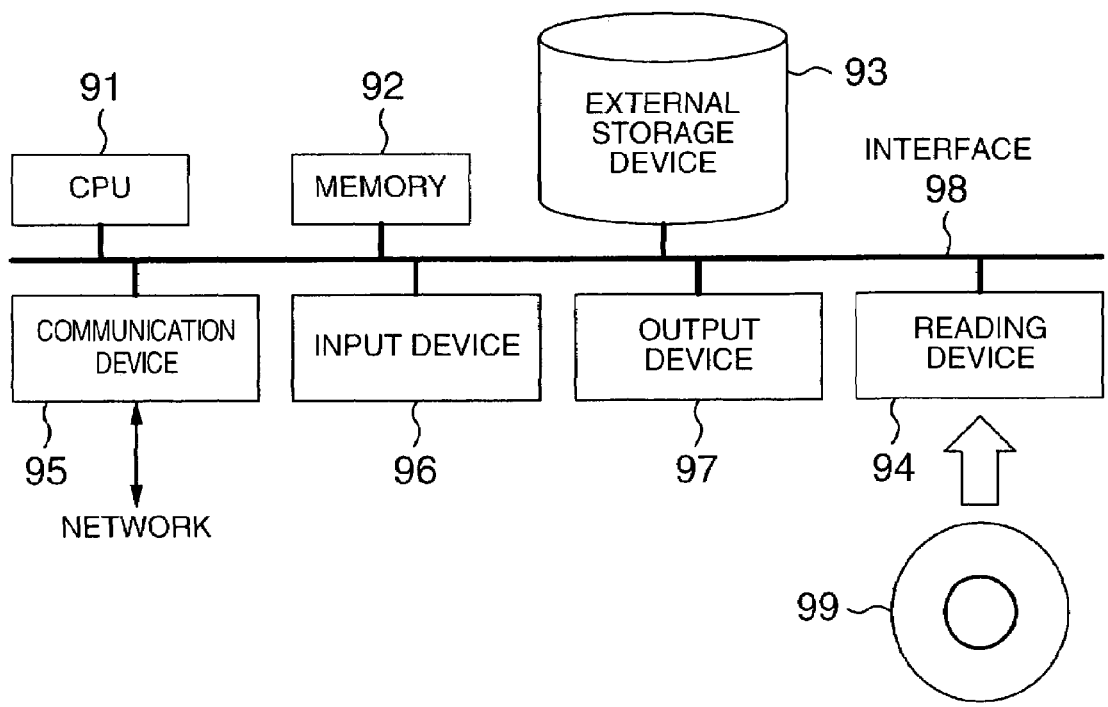

AUTHENTICATION AND AUTHORIZATION INFRASTRUCTURE SYSTEM WITH CRL ISSUANCE NOTIFICATION FUNCTION

BACKGROUND OF THE INVENTION

1. Field of the Invention

The present invention relates to a public key infrastructure system comprising a certification authority that issues a public key certificate revocation list, a server for certificate validation that verifies a validity of a public key certificate, and a client who uses the certificate validation server.

2. Description of the Related Art

[Patent Reference 1]: US 2002/0046340A1, [Non-Patent Reference 1]: ITU, ITU-T Recommendation X.509 "Information technology—Open systems interconnection—The Directory: Public-key and attribute certificate frameworks", ITU, March 2000, p. 7-53, and [Non-Patent Reference 2]: "GPKI Government Public Key Infrastructure interoperability specification" p. 18-20, 27-29, "online", Apr. 25, 2001, approved by Basic Problem Workgroup, "searched on Mar. 14, 2003", Internet <URL:

http://www.soumu.go.jp/gyoukan/kanri/010514_
2.pdf>teach CRLs, server models, and public keys.

Systems using the public key infrastructure (referred to simply as PKI) including a Government Public Key Infrastructure (GPKI), are coming into wide use to identify a person who produced an electronic document of interest and guarantee that the electronic document has not been changed or tampered with (see, for example, non-patent reference 1). In a PKI-based system, an electronic document is electronically signed by a person affixing his or her digital signature using a key called a private key, which is owned only by that person (referred to as a signatory). When an electronic document with a digital signature is received, the digital signature is verified to identify a producer of the electronic document and confirm that the electronic document is not tapered with.

In uses that require a high level of trust, to verify a digital signature requires not only verifying the digital signature of interest by using a key called a public key embodied in a public key certificate (simply referred to as a certificate) of the signatory but also checking whether or not the certificate of the signatory is a valid one for a person who verifies the digital signature (referred to as a verifier). To verify whether or not the certificate of the signatory is valid for the verifier, it is necessary to (1) discover a certification path and (2) verify the certification path.

The certification path is a chain of trust from the verifier to the signatory and is expressed in the form of a chain of certificates. Where the certification authorities issue certificates to each other, in particular, special certificates, called cross-certificates, are issued. When nine certification authorities from $1_1$ to $1_9$ have a cross-certification relationship with one another, as shown in FIG. 2, the certification path from a verifier having a certificate issued by the certification authority $I_2$ to a signatory having a certificate issued by the certification authority $I_1$ is a chain of certificates beginning with a cross-certificate $9_{18}$ followed by a cross-certificate $9_{68}$, a cross-certificate $9_{46}$, a cross-certificate $9_{24}$, and then finally a certificate of the verifier. A method of validating the certification path discovered in this manner is detailed in the above non-patent reference 1.

In one of the GPKI specifications, there are described an end entity model and a certificate validation server model as models for verifying the validities of certificates (see, for example, non-patent reference 2). The certificate validation server model uses a certificate validation server that provides a function to perform an online check on the validity of the certificate concerned on behalf of a client.

The certificate validation server model has the following advantages over the end entity model. First, since there is no need to mount a certification path discovery function on a client, the certificate validation server model can make the client signature verification program small. Further, because a client trusts the result of decision made by the certificate validation server, it is possible to flexibly cope with system configuration changes by simply changing a setting of the certificate validation server. According to the above non-patent reference 2, whether a particular certificate is valid or not is verified using a certificate revocation list (referred to as a CRL) issued by the certification authorities or an OCSP responder.

Since it is not efficient to retrieve the CRL from the certification authority every time a certificate validation is performed, the patent reference 1 discloses a method whereby the certificate validation server caches the certificates, the CRL and the certification path to increase the speed of the certificate validation process.

To verify a digital signature and build a certification path requires obtaining a certificate of the signatory.

The methods of obtaining a signatory certificate can be classed largely into two types.

One type of method involves a signatory sending an electronic document signed with a digital signature, with a certificate of the signatory to be obtained separately. One example of this method concerns a caser where a signatory sends an electronic document with a digital signature along with a URL that indicates the location where a certificate for verifying the digital signature is stored. With this method, the verifier needs to access the location where the certificate is stored (hereafter referred to as a certificate repository) to obtain the certificate.

Another type of method involves a signatory sending an electronic document with a digital signature along with a certificate that is used to verify the digital signature.

If a CRL is cached for an increased speed of the certificate validation process, when a certification authority issues a CRL in an urgent situation, the cached CRL is not the latest one any more. The patent reference 1 does not refer to this point.

One method for solving the above-mentioned problem to ensure that the certificate validation can be performed correctly even when the CRL is issued in an urgent situation, involves having the certificate validation server periodically access a location where the CRL is stored (hereinafter referred to as a CRL repository) to check if the CRL is updated. The above-described method is further classified into two types. One is to have the certificate validation server itself make a check via the network and another is to introduce CRL issuance check software into the CRL repository.

In enhancing the accuracy of the certificate validation by using the method of periodically checking whether or not the CRL is updated, it is necessary to shorten an interval between the checks as practically as possible. In the method where the certificate validation server itself makes a check through the network, however, shortening the check interval will give rise to a problem of increasing the load of the network.

In the method that introduces a CRL issuance check program into the CRL repository, on the other hand, there is a problem that if an administrator of the CRL repository and an administrator of the certificate validation server should differ, the installing of the CRL issuance check software is not permitted, leaving the check unperformable.

Further, in an environment where a plurality of certificate validation servers exist, all the certificate validation servers cannot perform the validation process with the same accuracy unless they all use the CRL issuance check software introduced into the CRL repository. So, if the number of operational certificate validation servers is to be increased or reduced, the setting of the CRL issuance check software needs to be changed. However, if the administrator of the CRL repository and the administrator of the certificate validation servers differ, it is difficult to flexibly change the number of certificate validation servers.

Another problem is that, if the certification path is cached but the certification authorities have revoked old cross-certificates and issued new cross-certificates, it is necessary to build a certification path including the new cross-certificates.

Further, in an environment in which there are a plurality of certificate validation servers, even if the plurality of certificate validation servers validate the same certificate, each of the certificate validation servers performs the certification path discovery and obtains the CRL. This raises a possibility of accesses concentrating on a particular CRL repository or on a particular certificate repository and also a possibility of an increased network load. The patent reference 1 does not refer to these problems.

Further, in the preceding method of obtaining the certificate separately, there is a problem that, to request the certificate validation server to verify the certificate, the client must first access the certificate repository to obtain the certificate.

Under these circumstances, a new technique for resolving these problems is being called for.

SUMMARY OF THE INVENTION

Viewed from one aspect the present invention provides a public key infrastructure system comprising: a certification authority having a certificate issuing means for issuing a certificate and a CRL issuing means for issuing a CRL; a certificate repository having a certificate storage means for storing the certificate issued by the certification authority; a CRL repository having a CRL storage means for storing the CRL issued by the certification authority; a certificate validation server having a certificate validation means for validating the certificate, a CRL cache means for caching the CRL retrieved from the CRL repository and a certification path cache means for caching a certification path discovered by the certificate validation means to validate the certificate; and a client having a digital signature verification means for verifying a digital signature and a certificate validation request means for requesting the certificate validation server to validate the certificate; wherein the certification authority has a CRL issuance notification transmission means for sending to the certificate validation server a CRL issuance notification that "a CRL has been issued" at the same time that the CRL is issued; wherein the certificate validation server has a CRL issuance notification reception means for receiving the CRL issuance notification from the certification authority.

In another aspect of the present invention, when the CRL issuance notification reception means receives the CRL issuance notification, the CRL cache means of the certificate validation server retrieves the CRL newly issued by the certification authority from the CRL repository.

In another aspect of the present invention, the certificate validation server has a CRL issuance notification transmission means which, when the certificate validation server finds that the CRL has been newly issued, sends a CRL issuance notification that "a CRL has been issued" to other pre-registered certificate validation servers.

In still another aspect of the present invention, the certification authority has a certificate issuance notification transmission means which, when the certificate is issued by the certificate issuing means, sends a certificate issuance notification that "a certificate has been issued" to the certificate validation server; the certificate validation server has a certificate issuance notification reception means for receiving the certificate issuance notification; when the certificate issuance notification reception means receives the certificate issuance notification, the certificate validation means builds a certification path that includes the newly issued certificate; and the certification path cache means caches the certification path.

In a further aspect of the present invention, the certificate validation server is provided with a certification path transmission means which, when a certification path is discovered, sends the certification path to other pre-registered certificate validation servers; and, when it receives the certification path from other certificate validation servers, the certification path cache means caches the certification path.

In a further aspect of the present invention, the client is provided with a certificate acquisition request means which asks the certificate validation server to obtain a certificate necessary to verify a digital signature; and the certificate validation server is provided with a certificate acquisition means which acquires the certificate requested by the client from the certificate repository and, when it is founded valid by the certificate validation means, sends the certificate to the client.

In a further aspect of the present invention, the certificate validation server is provided with a means for generating a message that "requests the sending of a CRL issuance notification"; the certification authority is provided with a means for receiving the CRL issuance notification request message; and the CRL issuance notification transmission means of the certification authority sends the CRL issuance notification to the certificate validation server that transmitted the CRL issuance notification request message to the certification authority.

In a further aspect of the present invention, the CRL repository is provided with a CRL issuance notification transmission means which, when it is found that a new CRL is stored in the CRL repository, sends a CRL issuance notification indicating that "a CRL has been issued" and also with a CRL issuance notification request reception means which receives a CRL issuance notification request message that "requests the sending of the CRL issuance notification."

In a further aspect of the present invention, the CRL issuance check software realizes: a means for monitoring the issuance of a CRL and, when a new CRL is issued, sending a CRL issuance notification; and a means for receiving a CRL issuance notification request message; wherein the CRL issuance notification transmission means sends the CRL issuance notification to an originating source of the CRL issuance notification request message.

In a further aspect of the present invention, the certificate validation server is provided with a means for receiving a CRL issuance notification request message generated by the CRL issuance notification request generation means.

Claims 8A and B are diagrams showing an example of a CRL issuance notification request message 10.

Figure 1:
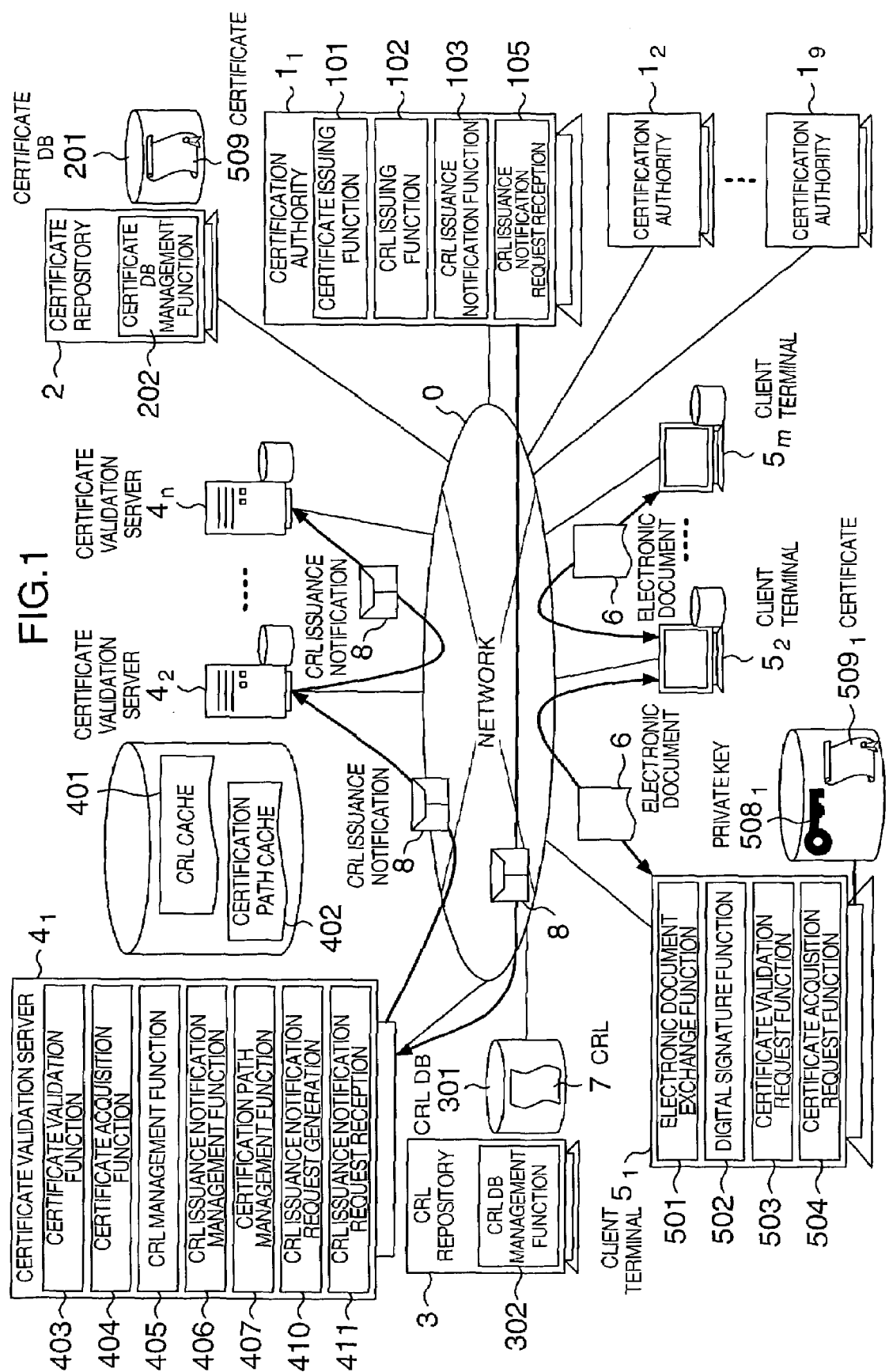
FIG. 1 is a schematic diagram showing a system configuration of a digitally signed electronic document exchange system that applies one embodiment of the present invention.

Claim 9 is a diagram showing a hardware configuration of each of a certification authority 1, a certificate repository 2, a CRL repository 3, a certificate validation server 4 and a client terminal 5 shown in FIG. 1.

DETAILED DESCRIPTION OF THE EMBODIMENTS

Now, embodiments of the present invention will be described by referring to the accompanying drawings. It should be noted that this invention is not limited in any way by the example embodiments presented.

FIG. 1 shows a configuration of a digitally signed electronic document exchange system, which embodies the present invention. This system has nine certification authorities (CAs) from CA $1_1$ to CA $1_9$ (generally referred to as certification authorities 1), a certificate repository 2, a CRL repository 3, n certificate validation servers from server $4_1$ to server $4_n$ (generally referred to as certificate validation servers 4), and m client terminals from client terminal $5_1$ to client terminal $5_m$ that request the certificate validation servers 4 to validate certificates (generally referred to as client terminals 5), all interconnected via a network 0.

The certification authorities 1 have a certificate issuing function 101 to issue certificates 509 to the client terminals 5 and store copies of the certificates 509 in the certificate repository 2, a CRL issuing function 102 to issue a CRL 7, a list of revoked certificates 509, and store the CRL 7 in the CRL repository 3, a CRL issuance notification function 103 to send to the certificate validation servers 4 a CRL issuance notification 8 that the CRL 7 was issued, and a CRL issuance notification request reception function 105 to receive a CRL issuance notification request message 10 that "requests the sending of the CRL issuance notification 8."

Figure 2:
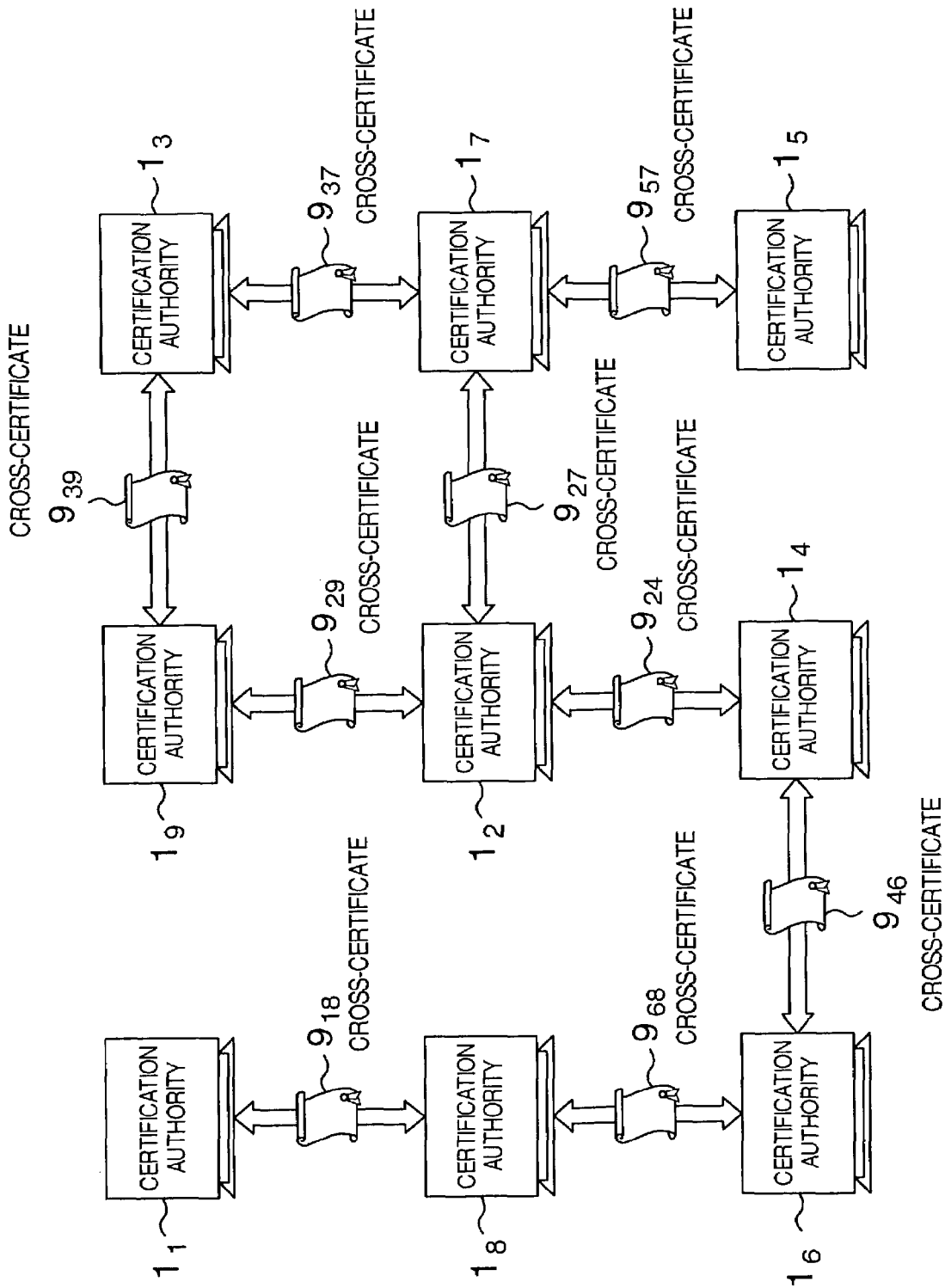
FIG. 2 is a diagram showing a relationship of cross-certification among certification authorities 1 in the embodiment.

The certification authorities 1 from CA $1_1$ to CA $1_9$ issue cross-certificates 9 to one another and there is a cross-certifying relationship among them as shown in FIG. 2.

The certificate repository 2 has a certificate DB 201 holding the certificates 509, and a certificate DB management function 202 to receive the certificates 509 from the certification authorities 1, store the certificates 509 in the certificate DB 201 and search and return a specified certificate 509 from the certificate DB 201.

The CRL repository 3 has a CRL DB 301 holding the CRLs 7, and a CRL DB management function 302 to receive the CRLs 7 from the certification authorities 1, store the CRLs in the CRL DB 301 and search and return a specified CRL 7 from the CRL DB 301.

The certificate validation servers 4 each have:
a CRL cache 401 that caches the CRLs 7;

a certification path cache 402 that caches a certification path used to validate certificates 509;

a certificate validation function 403 that, upon receipt of a request from a client terminal 5, validates a certificate;

a certificate acquisition function 404 that, in response to a request from a client terminal 5, picks up a relevant certificate 509 from the certificate repository 2, validates the certificate 509 by the certificate validation function 403 and, when the certificate 509 is found valid, sends it to the client terminal 5;

a CRL management function 405 that acquires a CRL 7 from the CRL repository 3 and stores it in the CRL cache 401;

a CRL issuance notification management function 406 which, when it receives a CRL issuance notification 8 from a certification authority 1, transfers the CRL issuance notification 8 to other pre-registered certificate validation servers 4 or to those certificate validation servers 4 which requested the transfer of the CRL issuance notification 8 by sending the CRL issuance notification request message 10;

a certification path management function 407 which caches the certification path built or discovered by the certificate validation function 403 in the certification path cache 402, sends the certification path to other pre-registered certificate validation servers 4 and caches certification paths received from other certificate validation servers 4 in the certification path cache 402;

a CRL issuance notification request generation function 410 which generates a CRL issuance notification request message 10 that requests the certification authority 1 to send the CRL issuance notification 8; and a CRL issuance notification request reception function 411 which receives the CRL issuance notification request message 10 from other certificate validation servers.

The client terminals 5 each have:
an electronic document exchange function 501 to exchange electronic documents 6 with other client terminals 5;

a digital signature function 502 which electronically signs electronic documents 6 and verifies digital signatures affixed on electronic documents 6 received from other client terminals 5;

a certificate validation request function 503 which requests a certificate validation server 4 to validate a certificate 509 and receives a result of validation from the certificate validation server 4;

a certificate acquisition request function 504 which, when an electronic document 6 is attached with a URL, instead of a certificate itself, indicating a storage location of the certificate 509, sends to a certificate validation server 4 identification information on the certificate to obtain the certificate 509 stored at the URL and receives the certificate 509 from the certificate validation server 4;

a private key 508 used by the digital signature function 502; and a certificate 509 issued by a certification authority 1.

A certificate $509_1$ of the client terminal $5_1$ is issued by a certification authority $1_1$ and a certificate $509_2$ of a client terminal $5_2$ is issued by a certification authority $1_2$.

In this embodiment, the certificate validation server 4 used by the certificate validation request function 503 and the certificate acquisition request function 504 is a particular certificate validation server 4 preselected from among the certificate validation servers $4_1$-$4_n$.

For example, the client terminal $5_2$ uses a certificate validation server $4_1$.

The certification authorities 1, the certificate repository 2, the CRL repository 3, the certificate validation servers 4 and the client terminals 5 shown in FIG. 1 can be realized by a CPU 91 executing a certain program loaded on a memory 92 in a general computer which comprises, as shown in FIG. 9 for example, the CPU 91, the memory 92, an external storage device 93 such as a hard disk, a reading device 94 for reading information from a removable storage medium 99 such as CD-ROM, a communication device 95 for communicating with other devices via a network, an input device 96 such as keyboard and mouse, an output device 97 such as monitor and printer, an interface 98 for transferring data between these devices.

That is, by executing a certain program, the CPU 91 can realize, as a process, a certificate issuing function 101, a CRL issuing function 102, a CRL issuance notification function 103, a CRL issuance notification request reception function 105, a certificate DB management function 202, a CRL DB management function 302, a certificate validation function 403, a certificate acquisition function 404, a CRL management function 405, a CRL issuance notification management function 406, a certification path management function 407, a CRL issuance notification request generation function 410, a CRL issuance notification request reception function 411, an electronic document exchange function 501, a digital signature function 502, a certificate validation request function 503, and a certificate acquisition request function 504. Further, a certificate DB 201, a CRL DB 301, a CRL cache 401 and a certification path cache 402 can be realized by the CPU 91 using the memory 92 and the external storage device 63.

The program to realize these devices on the computer may be loaded into the computer from the computer-usable removable storage medium 99 through the reading device 94 or may be introduced from other servers through the communication device 96 and a computer-usable communication media such as a network or a carrier wave that propagates on the network.

The program may be temporarily stored in the external storage device 93 before being loaded onto the memory 92 for execution by the CPU 91. Or it may be directly loaded onto the memory 92, without being stored in the external storage device 93, for execution by the CPU 91.

Next, an operation of the digital signature-based system of FIG. 1 will be explained with reference to the drawings when the certificate validation server 4 requests the certification authority 1 to send the CRL issuance notification 8.

Figure 7:
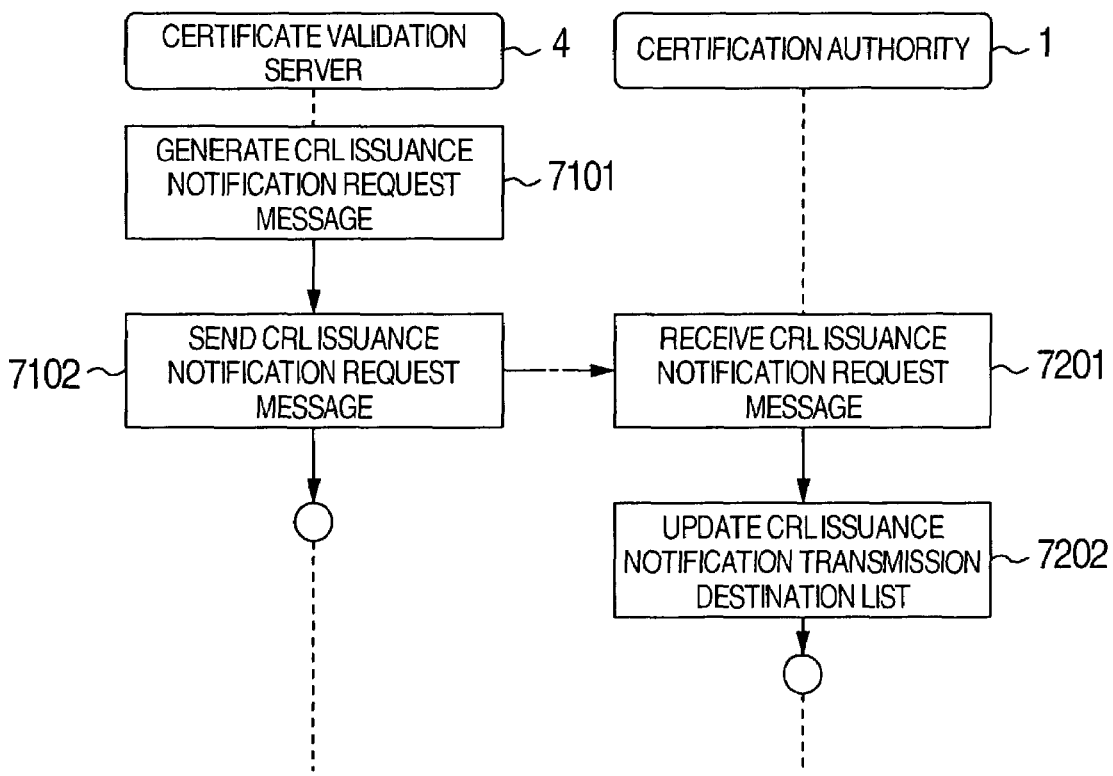
FIG. 7 is a diagram showing an operation of the digitally signed electronic document exchange system of FIG. 1 when a certificate validation server 4 requests a certification authority 1 to send a CRL issuance notification 8.

FIG. 7 shows an operation of the certificate validation server 4 and the certification authority 1 in the digital signature-based system of FIG. 1 when the certificate validation server 4 requests the certification authority 1 to send the CRL issuance notification 8.

In the certificate validation server 4, the CRL issuance notification request generation function 410 generates the CRL issuance notification request message 10 (step 7101) and sends it to the certification authority 1 (step 7102).

The CRL issuance notification request message 10 exemplified in FIG. 8A comprises a message that "requests the sending of the CRL issuance notification 8" and a hostname which represents an address on the network 0 of a destination of the CRL issuance notification 8.

In the certification authority 1, when the CRL issuance notification request reception function 105 receives a CRL issuance notification request message 10 (step 7201), it adds to a CRL issuance notification transmission destination list 104 a hostname of the certificate validation server 4 that transmitted the CRL issuance notification request message 10 (step 7202).

When the certificate validation server 4₁ requests the forwarding of the CRL issuance notification 8 to the certificate validation server 4₂, the CRL issuance notification request generation function 410 of the certificate validation server 4₁ generates the CRL issuance notification request message 10 and sends it to the certificate validation server 4₂.

The CRL issuance notification request reception function 411 of the certificate validation server 4₂ receives the CRL issuance notification request message 10 and adds the hostname of the originating certificate validation server 4 to the CRL issuance notification transmission destination list 104.

When the certificate validation server 4 requests the certification authority 1 to stop sending the CRL issuance notification 8, the server sends the CRL issuance notification request message 10 shown in FIG. 8B to the certification authority 1.

The CRL issuance notification request message 10 of FIG. 8B consists of a message that "requests the stopping of transmission of the CRL issuance notification 8" and a hostname of the destination of the CRL issuance notification 8.

Upon reception of the CRL issuance notification request message 10 of FIG. 8B, the certification authority 1 deletes the hostname of the certificate validation server 4 from the CRL issuance notification transmission destination list 104.

When the certificate validation server 4 requests other certificate validation servers 4 to forward, or stop forwarding, the CRL issuance notification 8, it sends the CRL issuance notification request message 10 to an intended certificate validation server 4.

Next, in the digital signature-based system of FIG. 1, the operation of the certification authority 1, the CRL repository 3 and the certificate validation server 4 when a CRL 7 is issued will be explained by referring to the drawings.

Figure 3:
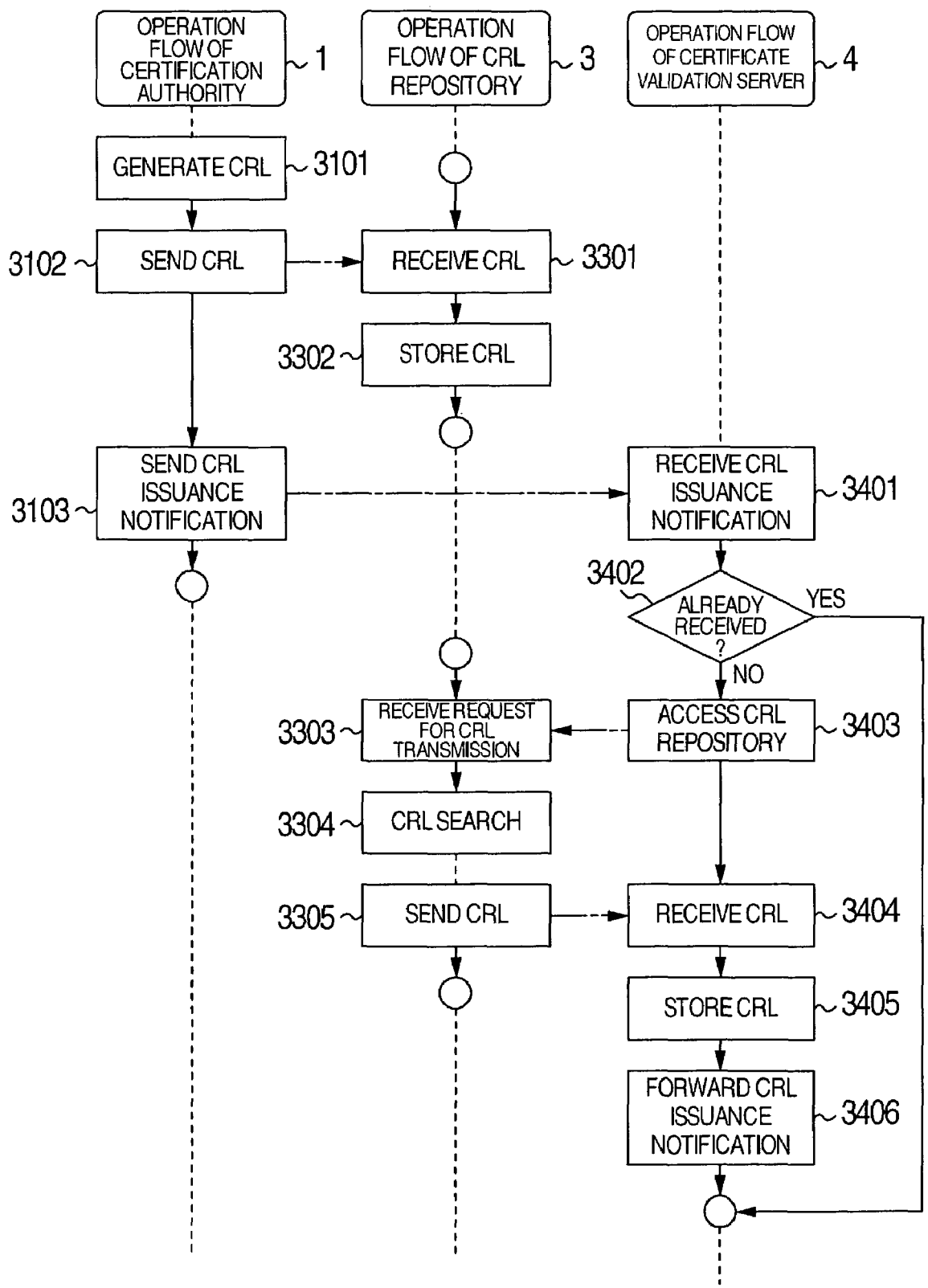
FIG. 3 is a flow diagrams showing operations of the embodiment when a CRL 7 is issued.

FIG. 3 illustrates the operation of the certification authority 1, the CRL repository 3 and the certificate validation server 4 in the digital signature-based system of FIG. 1 when a CRL 7 is issued.

First, let us look at the operation of the certification authority 1.

In the certification authority 1, when the CRL issuing function 102 generates a CRL 7 (step 3101), it sends the CRL 7 to the CRL repository 3 (step 3102).

Then, the CRL issuance notification function 103 generates a CRL issuance notification 8 and sends it to the predetermined certificate validation servers 4 or to those certificate validation servers 4 that requested the transmission of the CRL issuance notification 8 by sending the CRL issuance notification request message 10 (step 3103).

In this embodiment, the certification authority 1 sends the CRL issuance notification 8 to the certificate validation servers 4 whose hostnames are on the CRL issuance notification transmission destination list 104.

Figure 6A:
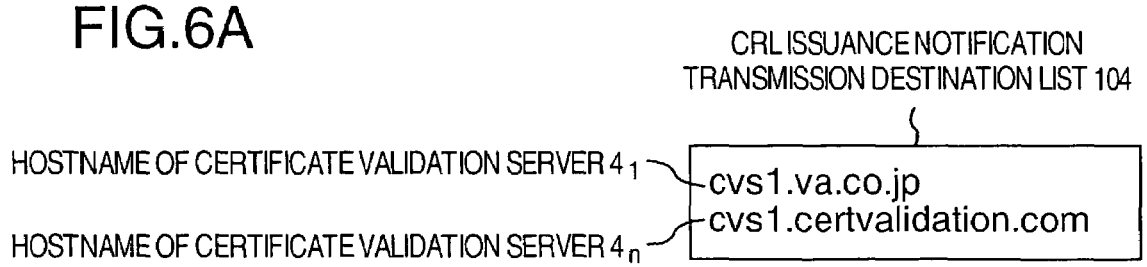
FIGS. 6A and B are diagrams showing examples of a CRL issuance notification transmission destination list 104 and a CRL issuance notification forwarding destination list 408.

FIG. 6A illustrates an example of a CRL issuance notification transmission destination list 104 managed by the certification authority 1, which shows a hostname of a certificate validation server 4₁ and a hostname of a certificate validation server 4ₙ.

Thus, the CRL issuance notification function 103 of the certification authority 1 sends the CRL issuance notification 8 to the certificate validation server 4₁ and the certificate validation server 4ₙ.

Next, the operation of the CRL repository 3 will be described.

The CRL DB management function 302 of the CRL repository 3 waits for an access from the certification authority 1 or the certificate validation server 4. Upon receiving a CRL 7 from the certification authority 1 (step 3301), the CRL DB management function 302 stores the CRL 7 in the CRL DB 301 (step 3302) and again waits for an access from the certification authority 1 or from the certificate validation server 4.

When it receives a request from the certificate validation server 4 to send a CRL 7 (step 3303), the CRL DB management function 302 searches through the CRL DB 301 for the CRL 7 (step 3304), sends it to the requesting server 4 and again waits for an access from the certification authority 1 or from the certificate validation server 4.

Next, the operation of the certificate validation servers 4 will be explained.

Here, the operation of the certificate validation server 4 will be explained by taking as an example the operation of the certificate validation server 4$_1$ when it receives the CRL issuance notification 8 from the certification authority 1.

First, in the certification validation server 4$_1$, when the CRL issuance notification management function 406 receives a CRL issuance notification 8 from a certification authority 1 or any other certificate validation server 4 (step 3401), it checks whether it already received the CRL issuance notification 8 (step 3402) and, when the CRL issuance notification 8 is found to have already been received, exits the processing.

When the CRL issuance notification 8 is found to be first received, the CRL management function 405 accesses the CRL repository 3 (step 3403), obtains the CRL 7 (step 3404) and caches it in the CRL cache 401 (step 3405).

Then, the CRL issuance notification management function 406 transfers the CRL issuance notification 8 to other pre-registered certificate validation servers 4 or to those servers which requested the transfer of the CRL issuance notification 8 by sending the CRL issuance notification request message 10 (step 3406).

The certificate validation server 4 uses a CRL issuance notification forwarding destination list 408 to manage the certificate validation servers 4 to which the CRL issuance notification 8 is to be forwarded.

Figure 6B:
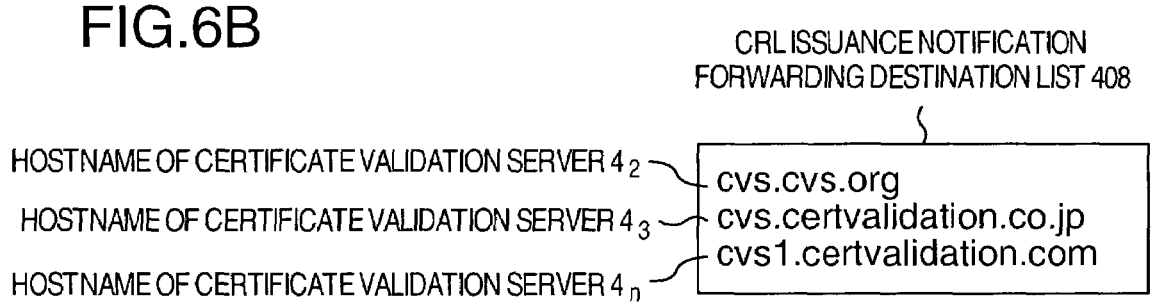

FIG. 6B illustrates an example of the CRL issuance notification forwarding destination list 408 managed by the certificate validation server 4$_1$, which shows a hostname of the certificate validation server 4$_2$, a hostname of the certificate validation server 4$_3$ and a hostname of the certificate validation server 4$_n$.

Therefore, the CRL issuance notification management function 406 forwards the CRL issuance notification 8 to the certificate validation server 4$_2$, the certificate validation server 4$_3$ and the certificate validation server 4$_n$.

In this embodiment, the hostnames of the certificate validation servers 4$_1$ to 4$_n$ are always present in one of the CRL issuance notification forwarding destination lists 408 held by the certificate validation servers 4$_1$ to 4$_n$ respectively.

With this arrangement, when one of the certificate validation servers 4 receives a CRL issuance notification 8 from the certification authority 1, the CRL issuance notification 8 can be sent to all the certificate validation servers 4$_1$ to 4$_n$ without fail.

When a new certificate validation server 4 is to be added, this can be done without changing the CRL issuance notification transmission destination list 104 by simply adding a hostname of the new certificate validation server 4 to one of the CRL issuance notification forwarding destination lists 408 held by the certificate validation servers 4$_1$-4$_n$.

Described above is the operation performed by the digital signature-based system of FIG. 1 when a CRL 7 is issued.

Next, in the digitally signed electronic document exchange system of FIG. 1, the operation of the system performed when an electronic document 6 is transmitted from a client terminal 5$_1$ to a client terminal 5$_2$ will be explained by referring to the drawings.

In this embodiment, there are two cases: one in which the certificate 509 to verify a digital signature affixed on the electronic document 6 is attached to the electronic document 6; and one in which it is not attached to the electronic document 6. First, let us look at the case where the certificate 509 to validate the digital signature is attached to the electronic document 6.

Figure 4:
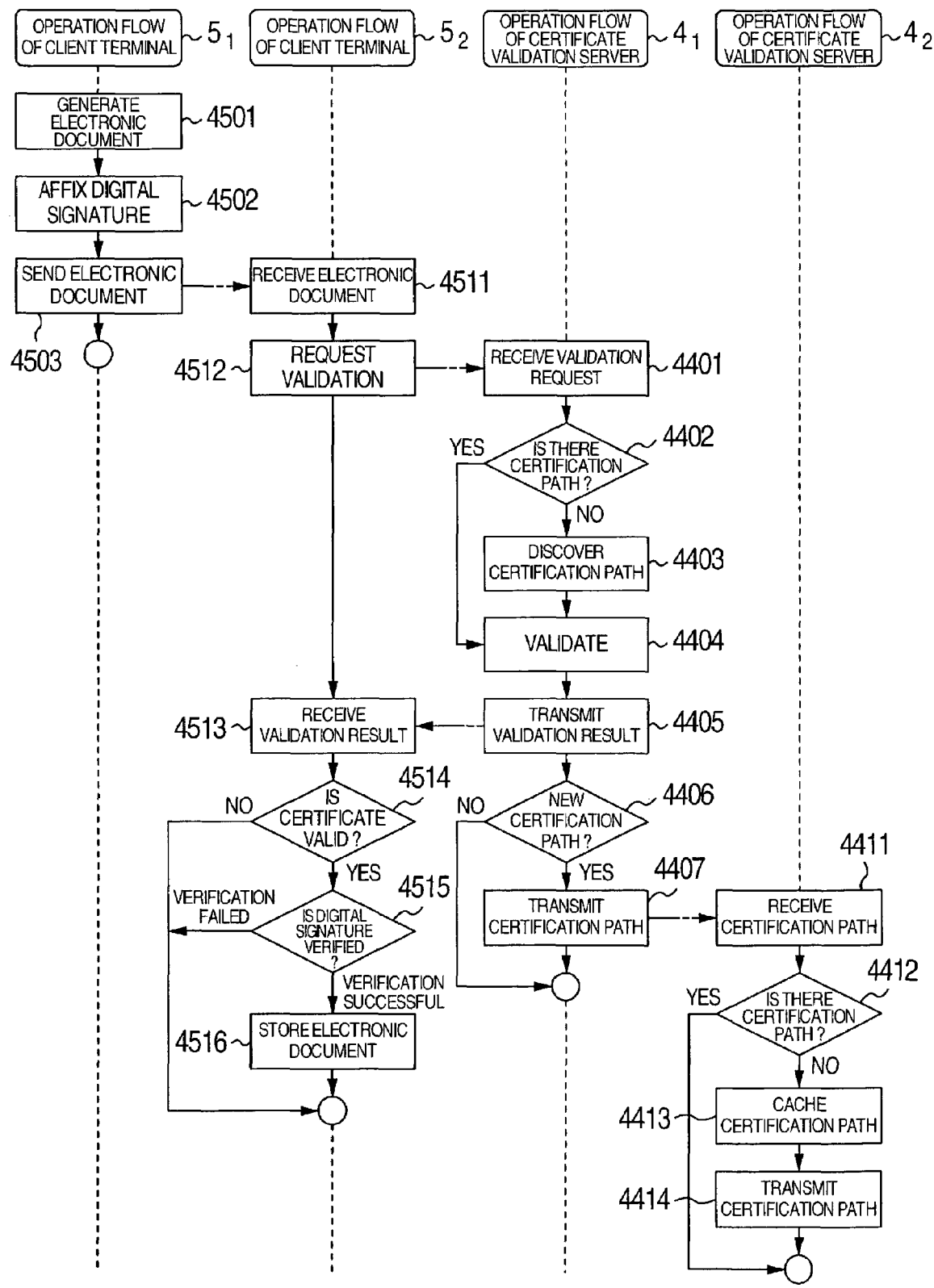
FIG. 4 is a flow diagrams showing operations of the embodiment when a client terminal 5 sends and receives an electronic document attached with a certificate 509.

FIG. 4 shows the operation of the client terminal 5$_1$, the client terminal 5$_2$, the certificate validation server 4$_1$ and the certificate validation server 4$_2$ in the digitally signed electronic document exchange system of FIG. 1 when the certificate 509 to validate a digital signature affixed on an electronic document 6 sent from the client terminal 5$_1$ to the client terminal 5$_2$ is attached to the electronic document 6.

First, the operation of the client terminal 5$_1$ is explained.

When the electronic document exchange function 501 of the client terminal 5$_1$ generates the electronic document 6 for transmission to the client terminal 5$_2$ (step 4501), the digital signature function 502 affixes a digital signature on the electronic document 6 by using the private key 508$_1$ (step 4502).

Next, the electronic document exchange function 501 sends the digitally signed electronic document 6 along with the certificate 509$_1$ to the client terminal 5$_2$ (step 4503).

Next, the operation of the client terminal 5$_2$ is explained.

When the client terminal 5$_2$ receives the electronic document 6 (step 4511), the certificate validation request function 503 of the client terminal 5$_2$ requests the certification validation server 4$_1$ to verify the validity of the certificate 509$_1$ received along with the electronic document 6 (step 4512) and receives a result of the validation from the certification validation server 4$_1$ (step 4513).

If the result of the validation finds that the certificate 509$_1$ is not valid for the client terminal 5$_2$, the terminal ends its processing.

If the result of the validation finds that the certificate 509$_1$ is valid for the client terminal 5$_2$, the digital signature function 502 retrieves a public key from the certificate 509$_1$ and validates the digital signature affixed on the electronic document 6 (step 4515). When it is decided that the digital signature is not correct, the processing is terminated.

When the digital signature is found correct, the electronic document 6 is stored (step 4516).

Next, the operation of the certificate validation servers 4 will be described.

First, when the certification validation server 4$_1$ is requested by the client terminal 5$_2$ to validate the certificate 509$_1$ (step 4401), the certificate validation function 403 checks if a certification path from the client terminal 5$_2$ to the client terminal 5$_1$ exists in the certification path cache 402 (step 4402).

If the certification path exists in the certification path cache 402, the certificate validation function 403 moves to a step 4404. If the certification path of interest does not exist in the certification path cache 402, the certificate validation function 403 discovers the certification path (step 4403) before proceeding to a step 4404.

In the step 4404, the certificate validation function 403 retrieves a CRL 7 from the CRL cache 401 and checks if the certification path is valid or not. Next, it sends the check result to the client terminal 5$_2$ (step 4405).

If the certification path in question is not a newly discovered one, the processing is ended. If on the other hand the certification path is the one that was newly discovered in the step 4403, it is sent to the certificate validation server 4 whose hostname is on a certification path transmission destination list 409 (step 4407), before terminating the processing.

The certification path transmission destination list 409 is a list of hostnames of the certificate validation servers 4 to which the newly discovered certification path is to be transmitted. In this embodiment, the CRL issuance notification forwarding destination list 408 is also used as the certification path transmission destination list 409.

Thus, in the step 4407, the certification path is sent to the certificate validation server $4_2$, the certificate validation server $4_3$ and the certificate validation server $4_n$.

While this embodiment uses the same list as the CRL issuance notification forwarding destination list 408 and the certification path transmission destination list 409, the present invention is not limited to this arrangement and may use different lists.

When the certificate validation server $4_2$, the certificate validation server $4_3$ and the certificate validation server $4_n$ receive the certification path from the certificate validation server $4_1$ (step 4411), the certification path management function 407 checks if the certification path is cached in the certification path cache 402 (step 4412).

If the certification path is cached in the certification path cache 402, the processing is ended without performing anything. If the certification path is not cached in the certification path cache 402, the certification path management function 407 caches it in the certification path cache 402 (step 4413), sends the certification path to the certificate validation server 4 whose hostname is on the certification path transmission destination list 409 (step 4414), and then exits the processing.

While in this embodiment the certification path management function 407 of the certificate validation server 4 sends/receives and caches the certification path, the present invention is not limited to this arrangement. For example, it is possible to have the certification path management function 407 send/receive and cache certification path information that permits unique identification of the certification path or build the corresponding certification path from the certification path information as needed.

Described above is the operation of the digitally signed electronic document exchange system of FIG. 1 when a certificate 509 used to verify a digital signature affixed on an electronic document is attached to the electronic document 6 that is sent from the client terminal $5_1$ to the client terminal $5_2$.

Next, with reference to the drawings, the operation of the digitally signed electronic document exchange system of FIG. 1 will be explained for a case where the certificate 509 to validate a digital signature on an electronic document 6 is not attached to the electronic document 6 that is transmitted from the client terminal $5_1$ to the client terminal $5_2$.

Figure 5:
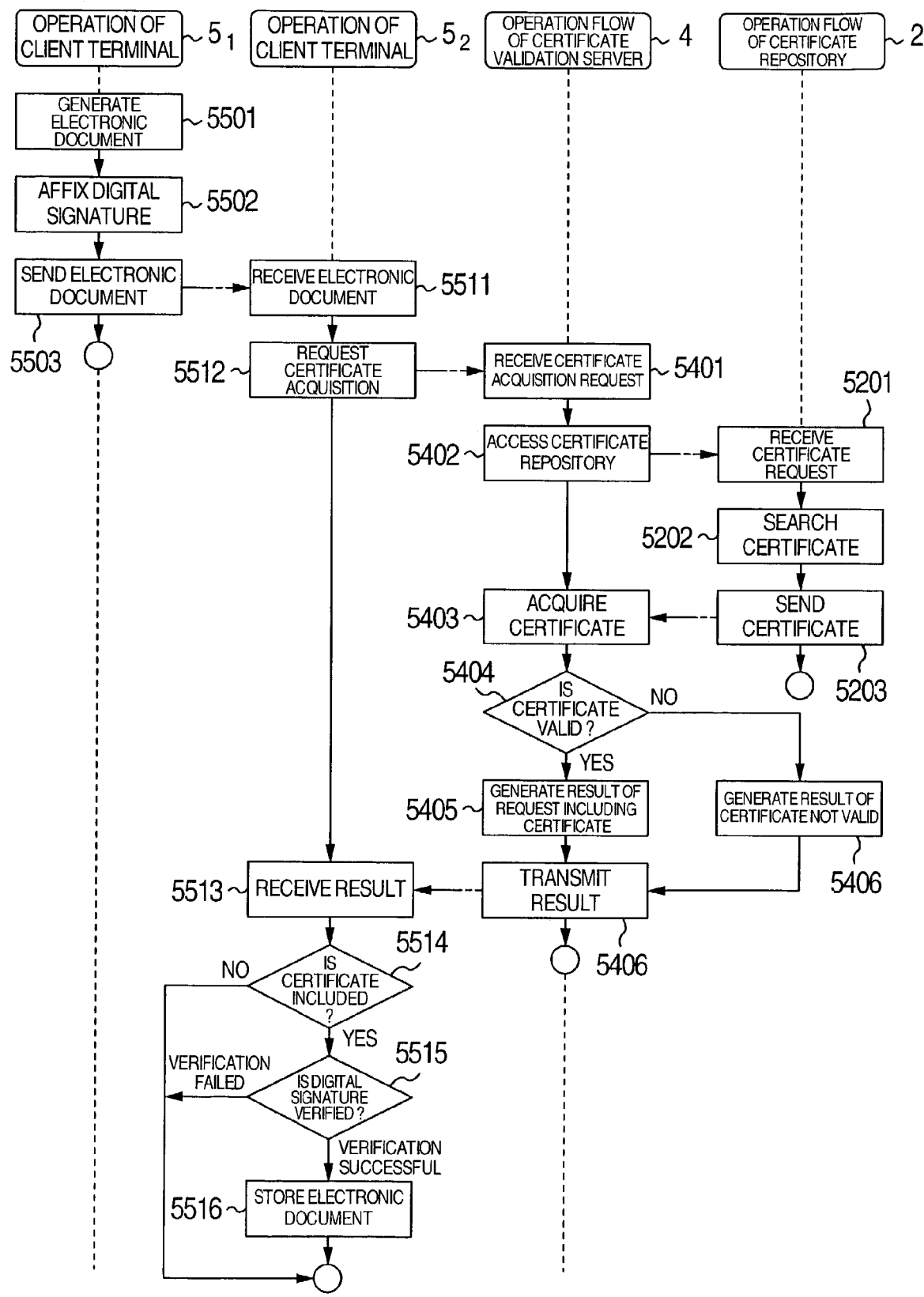
FIG. 5 is a flow diagrams showing operations of the embodiment when a client terminal 5 sends and receives an electronic document not attached with a certificate 509.

FIG. 5 shows the operation of the client terminal $5_1$, the client terminal $5_2$, the certificate validation server 4 and the certificate repository 2 in the digitally signed electronic document exchange system of FIG. 1 when the certificate 509 to validate a digital signature affixed on an electronic document 6 sent from the client terminal $5_1$ to the client terminal $5_2$ is not attached to the electronic document 6.

First, the operation of the client terminal $5_1$ will be explained.

When the electronic document exchange function 501 of the client terminal $5_1$ generates an electronic document 6 to be transmitted to the client terminal $5_2$ (step 5501), the digital signature function 502 affixes a digital signature on the electronic document 6 using the private key $508_1$ (step 5502).

Next, the electronic document exchange function 501 transmits the digitally signed electronic document 6 with a URL representing a storage location of the certificate $509_1$ to the client terminal $5_2$ (step 5503).

While this embodiment transmits a URL representing the storage location of the certificate 509 along with the electronic document 6, the present invention is not limited to this arrangement. For example, it is possible to transmit a part of information contained in the certificate 509.

Next, the operation of the client terminal $5_2$ will be explained.

When the client terminal $5_2$ receives the electronic document 6 (step 5511), the certificate acquisition request function 504 requests the certification validation server $4_1$ to obtain the certificate $509_1$ corresponding to the URL transmitted together with the electronic document 6 (step 5512), and receives a result of the request from the certification validation server $4_1$ (step 5513).

If the result of the request does not include the certificate $509_1$, i.e., the certification validation server $4_1$ decides that the certificate $509_1$ indicated by the URL is not valid for the client terminal $5_2$, the processing is exited. If the result of the request includes the certificate $509_1$, the certificate validation request function 503 retrieves a public key from the certificate $509_1$ to validate the digital signature affixed on the electronic document 6 (step 5515). Then, if the validation finds the digital signature to be not correct, the processing is stopped. If the digital signature is found correct, it is stored (step 5516) before exiting the processing.

Next, the operation of the certificate validation servers 4 will be described.

Upon receiving a request from the client terminal $5_2$ to acquire the certificate $509_1$ (step 5401), the certificate acquisition function 404 of the certification validation server $4_1$ accesses the certificate repository 2 by using the URL sent from the client terminal $5_2$ (step 5402) to obtain the certificate $509_1$ (step 5403).

Next, the certificate validation function 403 checks whether the certificate $509_1$ is valid for the client terminal $5_2$ (step 5404).

The operation of the certificate validation function 403 is the same as that from step 4402 to step 4409 in FIG. 4 and its explanation is omitted here.

If the check finds that the certificate $509_1$ is valid for the client terminal $5_2$, the certificate validation function 403 generates a result of the request including the certificate $509_1$ (step 5405) and sends it to the client terminal $5_2$ (step 5407). If on the other hand it is decided that the certificate $509_1$ is not valid for the client terminal $5_2$, the certificate validation function 403 generates a result of the request indicating that "the certificate is not valid" (step 5406) and sends it to the client terminal $5_2$ (step 5407).

Next, the operation of the certificate repository 2 will be explained.

Upon receipt of a request from the certification validation server $4_1$ to send the certificate $509_1$ (step 5201), the certificate DB management function 202 searches through the certificate DB 201 for the certificate $509_1$ (step 5202), and sends it to the certificate validation server 4 (step 5203).

Described above is the operation of the digitally signed electronic document exchange system of FIG. 1 when a certificate 509 used to verify a digital signature affixed on an electronic document is not attached to the electronic document 6 that is sent from the client terminal $5_1$ to the client terminal $5_2$.

In the digitally signed electronic document exchange system of this embodiment, as described above, when the certification authority 1 issues a CRL 7, it sends a CRL issuance notification 8 to certificate validation servers 4 whose hostnames are on the CRL issuance notification transmission destination list 104, thus notifying the certificate validation servers 4 that it has issued the CRL 7. The certificate validation servers 4 that have received the CRL issuance notification 8 acquire the CRL 7 from the CRL repository 3 and cache it.

Therefore, if the certification authority 1 issues a CRL 7 in an urgent situation, because the CRLs cached by these certificate validation servers 4 are the latest ones, the accuracy of the validation of the certificate 509 can be assured.

Further, in the digitally signed electronic document exchange system of this embodiment, the certificate validation servers 4 that received the CRL issuance notification 8 transfer the CRL issuance notification 8 to other certificate validation servers 4 whose hostnames are listed in the CRL issuance notification forwarding destination list 408.

Therefore, a new certificate validation server 4 can be added by simply putting a hostname of the new certificate validation server 4 on the CRL issuance notification forwarding destination list 408 in the certificate validation server 4 to forward the CRL issuance notification 8 to the new server, without having to change settings on the side of the certification authority 1.

Further, in the digitally signed electronic document exchange system of this embodiment, when the certificate validation server 4 receives a certification path from other certificate validation server 4, it caches the received certification path. When it discovers a new certification path, the certificate validation server 4 sends the new certification path to other certificate validation servers 4 whose hostnames are listed on the certification path transmission destination list 409.

This arrangement allows the certification path to be shared among a plurality of certificate validation servers 4, preventing accesses to the certificate repository 2 and the CRL repository 3 from becoming concentrated or the load of the network from increasing.

Further, in the digitally signed electronic document exchange system of this embodiment, when the client terminal 5 receives a URL indicating a storage location of the certificate 509, the client terminal 5, rather than accessing the certificate repository 2, requests the certificate validation server 4 to obtain the certificate 509. Only when the certificate 509 obtained from the certificate repository 2 is valid for the client terminal 5, does the certificate validation server 4 return the certificate 509 to the requesting client terminal 5.

Therefore, the client terminal 5 does not need to have the function of accessing the certificate repository 2.

While in this embodiment the CRL issuance notification 8 only carries information to the effect that "a CRL has been issued," the present invention is not limited to this arrangement.

For example, the CRL issuance notification 8 may contain a newly issued CRL 7 or information on difference between a previously issued CRL 7 and a newly issued CRL 7. The CRL issuance notification 8 may also contain a list of identification information on newly revoked certificates 509.

By putting in the CRL issuance notification 8 a newly issued CRL7 itself, information on difference between the previously issued CRL 7 and the newly issued CRL 7, and a list of identification information of newly revoked certificates 509, the certificate validation server 4 that has received the CRL issuance notification 8 can eliminate the step of accessing the CRL repository 3 and acquiring the newly issued CRL 7.

While in this embodiment the transmission of the CRL issuance notification 8 and the reception of the CRL issuance notification request message 10 are carried out by the certification authority 1. The present invention is not limited to this arrangement. For example, the transmission of the CRL issuance notification 8 and the reception of the CRL issuance notification request message 10 may be done by the CRL repository 3.

Alternatively, CRL issuance check software may be introduced into the CRL repository 3 to realize a function which monitors the issuance of the CRL 7 and, when a new CRL 7 is found to be issued, transmits the CRL issuance notification 8. The CRL issuance check software may also realize the CRL issuance notification request reception function. The CRL issuance notification transmission function may send the CRL issuance notification to an originating source of the CRL issuance notification request message.

The CRL issuance check software allows the use of the certification authority 1 and the CRL repository 3 that have no CRL issuance notification transmission function. Further, managing the destinations of the CRL issuance notification by the CRL issuance notification request reception function can flexibly change the number of certificate validation servers even if the administrator of the CRL repository and the administrator of the certificate validation servers are different.

With this embodiment, since the CRL issuance notification 8 is sent from the certification authority only to the certificate validation server when it issues a CRL, there is no need to check whether a CRL is issued or not at predetermined intervals. This reduces the load of the network 0.

Further, since the CRL issuance notification 8 is issued by the certification authority 1, if an administrator of the CRL repository 3 and an administrator of the certificate validation server 4 differ, a high level of accuracy of the certificate validation can be assured.

Further, since the certificate validation server 4 can request the transmission of the CRL issuance notification 8 by sending the CRL issuance notification request message 10, it is possible to flexibly change the number of certificate validation servers 4 if the administrator of the CRL repository 3 and the administrator of the certificate validation servers 4 are different.

Further, when the certificate validation server finds that a new CRL has been issued, it notifies other certificate validation servers of the issuance of the new CRL.

When it is desired to change the certificate validation servers to which the CRL issuance notification is to be sent, the setting of the certificate validation server need only be changed, making it possible to flexibly change the number of certificate validation servers even if the administrator of the CRL repository and the administrator of the certificate validation servers are different.

Further, when the certificate validation server newly discovers a certification path, the new certification path is transferred to other certificate validation servers so that it can be shared among the servers. This arrangement therefore prevents accesses to the CRL repository and the certificate repository from becoming overcrowded and the network load from increasing.

Further, in a case where a certificate is acquired independently of an electronic document, the client, rather than accessing the certificate repository to obtain the certificate, requests the certificate validation server to obtain and validate the certificate. This arrangement obviates the need for the client to have the function of accessing the certificate repository to obtain the certificate.

This invention, therefore, allows the validation of a certificate to be executed reliably with high accuracy and small load.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A certificate validation server for public key certificate, comprising:
   transmission means connected to a network and thereby communicating with a certification authority or a certification validation server;
   a certificate validation means for validating a certificate;
   cache means for caching a CRL for use by said certificate validation means;
   CRL management cache means for obtaining and storing said CRL in said cache means; and
   a CRL issuance notification management means for receiving a CRL issuance notification, which is a messacie to indicate that a CRL has been issued, from said certification authority or said certification validation server.

2. A certificate validation server according to claim 1, wherein said CRL management means checks whether a CRL has been newly issued or not and wherein said CRL issuance notification management means, when said CRL management means finds that the CRL has been newly issued, sends a CRL issuance notification that a CRL has been issued to other pre-registered certificate validation servers through said transmission means.

3. A certificate validation server according to claim 1, wherein the CRL management means, when the CRL issuance notification management means receives the CRL issuance notification, acquires a newly issued CRL.

4. A certificate validation server according to claim 3, wherein the CRL issuance notification received by said CRL issuance notification management means includes an item describing a newly issued CRL.

5. A certificate validation server according to claim 3, wherein the CRL issuance notification received by said CRL issuance notification management means includes an item describing difference information between a previously issued CRL previously issued before said CRL and a newly issued CRL, and wherein CRL management means acquires the newly issued CRL depending on reception of said difference information.

6. A certificate validation server according to claim 3, wherein the CRL issuance notification received by said CRL issuance notification management means includes an item describing a list of identification information on a newly revoked certificate, and wherein CRL management means acquires the newly issued CRL depending on reception of said identification information.

7. A certificate validation server according to claim 3, wherein said CRL management means checks whether a CRL has been newly issued or not and accesses, when said CRL management means finds that the CRL has been newly issued a CRL repository through said network to acquire the newly issued CRL.

* * * * *